Patented July 7, 1925.

1,545,154

UNITED STATES PATENT OFFICE.

HERMANN MEHNER, OF BERLIN-CHARLOTTENBURG, GERMANY.

PROCESS FOR THE OPERATION OF REVERBERATORY FURNACES.

Application filed February 14, 1922. Serial No. 536,569.

*To all whom it may concern:*

Be it known that I, HERMANN MEHNER, residing at Berlin-Charlottenburg, Schlosstrasse 66, in Germany, have invented certain new and useful Improvements in a Process for the Operation of Reverberatory Furnaces, of which the following is a specification.

The invention has reference to improvements in the operation of flame furnaces. According to the present invention it is possible to carry out chemical and physical processes, especially strongly endothermic processes, without the intermediary of a muffle wall between the charge and the source of heat. This is accomplished by exposing the material to be treated to the action of radiant energy in a flame furnace, i. e. in a furnace with a flame acting as source of heat above or in front of the charge, and by interposing a gaseous layer between the charge and the flame, which layer does not disturb the chemical or physical process or which may be of a nature to promote the same, and which keeps the flame gases remote from the charge. The new process may be carried out by conducting comparatively cold heating or fuel gases above the charge and by at least in part subjecting them to combustion by the introduction of air into that furnace space which is not occupied by the charge. Instead of cold heating gases, gases of suitable chemical nature may be supplied directly above the charge and the necessary combustion gases may be supplied to the furnace space above said gas of suitable chemical nature. Volatile reaction products formed may, in accordance with the invention, be led off downwardly through a permeable hearth.

Figure 1:
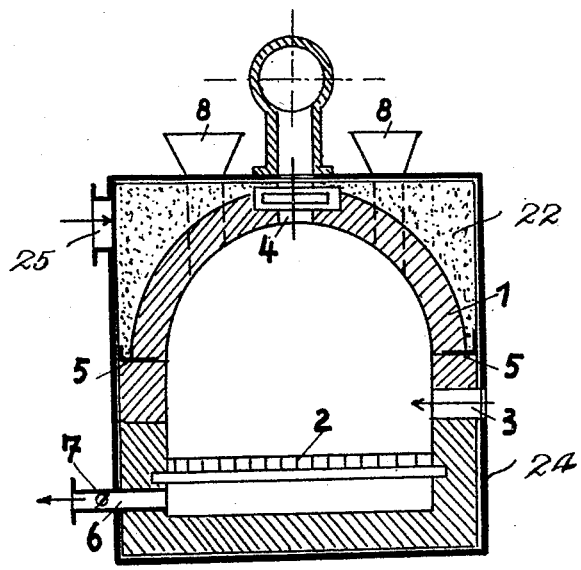
Figure 2:
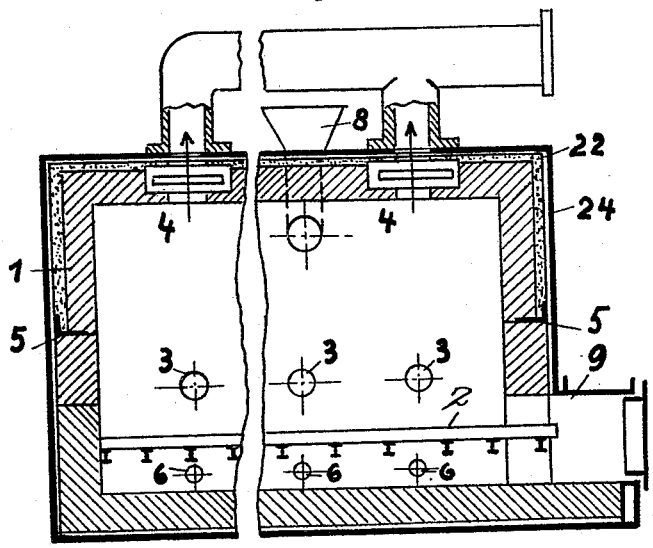
Figure 3:
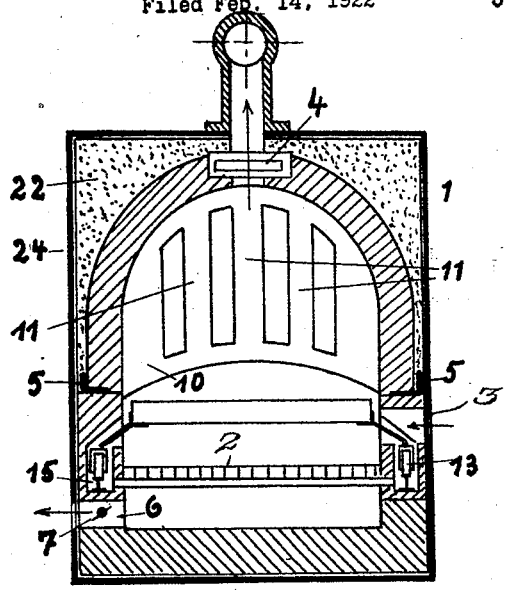
Figure 4:
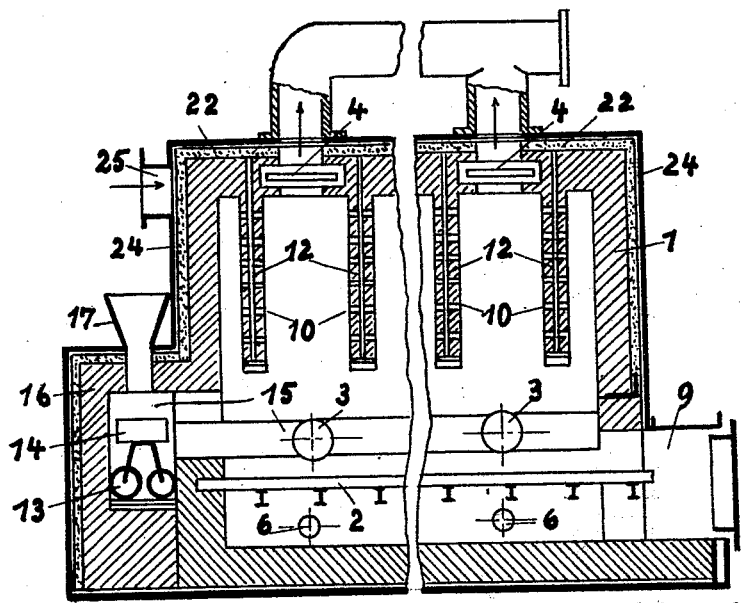
Figure 5:
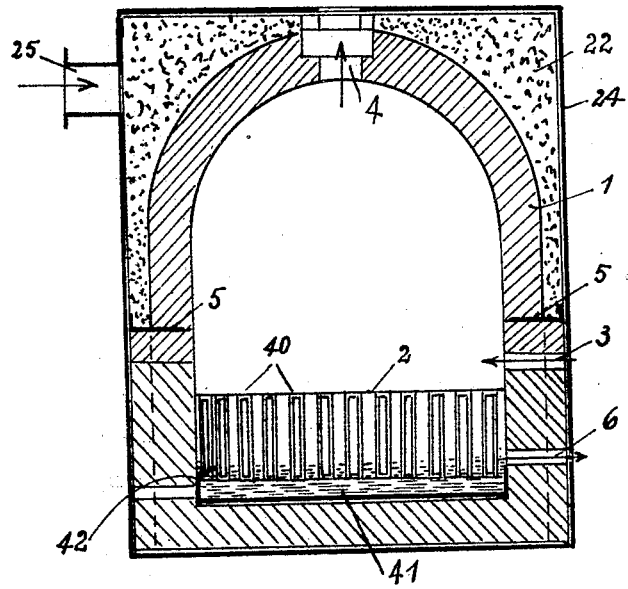
Figure 6:
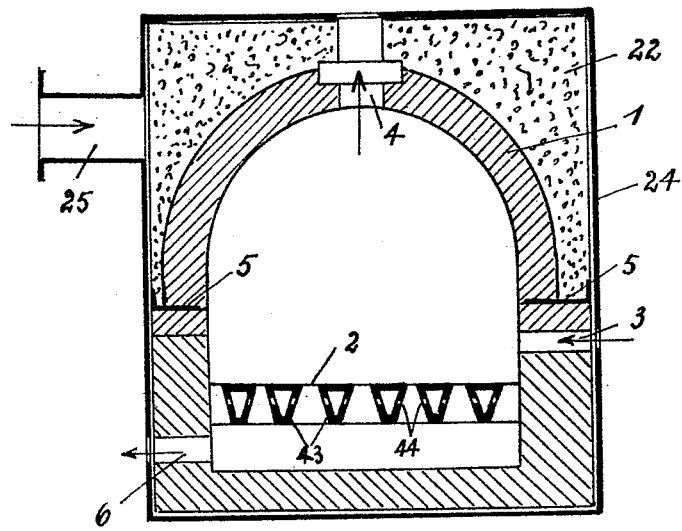

In the accompanying drawings several constructions of flame furnaces suitable for carrying out my new process are shown. Fig. 1 is a cross-section. Fig. 2 is a fragmentary longitudinal section of a simple form of furnace construction. Fig. 3 is a cross-section of a modification. Fig. 4 is a fragmentary longitudinal section of Fig. 3. Figs. 5 and 6 show cross-sections of further constructional modifications. The same reference letters are used for identical parts in the several figures.

Underneath the furnace vault 1, the grate or pervious hearth 2 is arranged, upon which a suitable charge of material is placed. In the following specification the expression "grate" means not exclusively a usual grate of iron bars but generally any kind of pervious grate or hearth. In the case of the manufacture of metallic sodium for instance, the grate may be charged with coal to which sodium carbonate or the like has been added either in admixture or as a superposed layer. When this charge is heated, it yields carbon monoxide and sodium, without the admission of nitrogen, according to the equation:

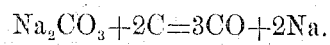
$$Na_2CO_3 + 2C = 3CO + 2Na.$$

However, the generation of these valuable reaction gases consumes from two hundred thousand to three hundred thousand thermal units per kilogram-equivalent, that is to say, kilogram calories. An idea of this amount of heat may be had if we take into consideration that an ordinary fire with ideal chemically pure carbon yields only 97 thousand thermal units in the combustion to carbon dioxid, and only 29 thousand thermal units by combustion to carbon monoxide which, in the case of this invention, is the only combustion to be considered.

In accordance with this invention, the charge on the grate of the pervious hearth is maintained at the high temperature by causing it to be exposed to radiant energy. For this purpose, producer gas is admitted to the preferably adjustable openings 3, while air is forced into the upper portion of the furnace through the packing or filling about the arch or dome of the furnace and through the small ports or interstices of the fire-proof bricks of the vault 1 which are constituted by the pores of the porous bricks and by the gaps between the brick pieces, care being taken to feed the air in the required amount. The vault of the furnace will then become heated to glowing, and its heat, and the heat of burning gas, are radiated upon the grate. The gas contents of the furnace are not capable of transferring any heat in the usual manner of convection or conduction, inasmuch as the gases of combustion, which are underneath the upper part of the vault 1, and which escape through the flues 4, are very hot, while on the other hand the heating gases remain comparatively cool on account of the fact that they are permeated by the radiant energy, just as the atmosphere we breathe transmits or is permeated by the sun's rays without itself being heated thereby, so that these gases are much heavier.

A portion of the heating gases which becomes heated in contact with the charge on the grate, may be drawn off from below with the products of reaction, for which purpose the escape conduits 6 with the adjustable throttling means 7 are provided below the grate or pervious hearth 2. The entire furnace 1 is mounted air-tightly within a sheet metal casing 24, air being admitted to the filling material 22 through the opening 25 the filling being separated from the lower portion of the furnace structure by means of a gas-tight inserted member 5 which, in the present instance, may consist of an angle iron. If the maximum of pressure desired is imparted to the incoming air, while a lower pressure is imparted to the heating gases, the entire apparatus will operate like any other kind of furnace and if the flues 4 and the throttling means 7 for the eduction openings are adjusted in accordance with the amount of gases formed directly in the reaction, these gases will be led off downwardly. The downwardly directed part of the current of reaction gases is considerably cooled when flowing through the charge on the pervious grate, provided the charge is sufficiently high thereon. The charge must be sufficiently high, because hot gases give up their heat, as experience proves, to a layer of colder material if not too shallow.

The furnace is provided with charging openings 8 and with cleaning apertures 9, and with windows (not shown) for watching the process, and the air may be heated before being forced into the furnace through the filling 22 and pervious arch by way of opening 25 through the metallic casing 24. Also the grate may be made movable so as to facilitate the removal of the slags.

Furthermore, as shown in Figures 3 and 4, the heating surface in the upper portion or dome of the furnace 1 may be increased by transverse partitions 10 which partitions may be further subdivided so as to constitute columns 11. The transverse partition and columns may be provided with the said channels communicating with a conduit 12 for carrying the hot air which is forced into them, and discharging the air into the interior of the furnace. For feeding the furnace with soda, a special strewing or sprinkling car 13 may be displaceably arranged within the furnace, which car is caused to be moved periodically or intermittently over the carbon charge on the grate 2 by means of any suitable gear or rack mechanism, not shown in the drawing. This sprinkling car 13 may be provided with a strewing or sprinkling contrivance shown diagrammatically at 14, and is similar for instance to a fertilizer strewing machine. The wheels 13 of the car 14, and the rails on which the car runs, are arranged outside of the zone reached by radiation, preferably within the recesses 15 of the walls. In the comparatively long intermissions of the sprinkling or strewing operation, the car 14 remains in the lateral chamber 15 which is provided with a suitable feeding device 17, conventionally indicated in the drawing as a hopper or the like. The introduction of the soda may, of course, also be effected by means other than a car, for example by injection by means of nozzles or twyers, or manually by throwing the material with a shovel into the furnace, or in any other manner.

The charging with a small quantity of soda and an excess of carbon is of importance for the practical execution of this invention. If the equivalent quantities of soda and coal or carbon were introduced upon the grate 2, this mixture would constitute a substantially gas-tight mass through which it would be impossible to cause the gaseous products of reaction—$3CO+Na_2$—to pass by suction or pressure. In order to cause the mass to react, the soda should be liquefied, and then it would flow through the grate. The soda is therefore placed upon an excess of coal in limited quantities, substantially sure of absorption. The vapors of the metallic sodium are condensed below the grate in any suitable way. This condensation of sodium which, as is well known, it is difficult to accomplish, may for instance be carried out by having the grate comprise a plurality of plates placed on edge, and provided with interior cooling by water. The plates may be immersed in a sealing liquid in which the sodium which runs down their surface may be collected.

Aside from the production of sodium, the process and the apparatus according to the invention may also be used for other chemical processes of similar physical behaviour. For instance, aside from sodium from soda, other volatile metals may be obtained from their reducible compounds. By dispensing with reducible additions altogether in the charge of coal, illuminating gas may be produced, in which case suitable means for the ejection of the coke will have to be provided, if the process is to be worked continuously. By admitting water vapours or water to the carbon, water gas may be produced in a continuous operation which is particularly advantageous, because there is no necessity of interrupting the operation by repeated fresh heating which yields sufficient heat only for a few minutes, as in the ordinary processes of making water gas.

Then according to the new process, the water gas may be produced at the very highest, and therefore the most favourable temperature. The following process which, heretofore, has not yet been realized industrially—

$$C + H_2O = CO + H_2$$

may be carried out smoothly and perfectly. On the other hand the cold water gas process—

$$C + 2H_2O = 2H_2 + CO_2$$

may be carried out at a low temperature, which is of great importance in the manufacture of hydrogen.

In order to produce the necessary amount of energy expressed in heat units the heating chamber should radiate at the given temperature of from 1400 towards 2000 degrees centigrade, absolute more than a million great thermal units an hour to the square metre. It is therefore necessary to consume in round numbers 1000 cubic meters of producer gas of 1000 calories heating power for generating the radiation energy. This necessitates a large combustion chamber, so that it is preferable to make the furnace comparatively high.

By this heating by radiation a new means in the art has been obtained. The apparatus for the materialization thereof may be constructed in various ways according to the different purposes and conditions, and a multitude of purposes may be accomplished thereby which, though chemically speaking, not being related to the preparation of metallic sodium, are equivalent therewith from the physical point of view and as regards the heating art. Thus a multitude of chemical reactions and of physical processes and operations may easily be mentioned as suggesting themselves as being adapted for more perfect execution by the new heating process and some of which are even capable of execution only by the new method. Thus, the burning of lime may be mentioned. With the new heating process besides pure lime, valuable carbon dioxide for industrial purposes, free from nitrogen, is obtained, and from lime, which is free from bitumen, even carbon dioxide for the so-called aeration of beverages may be made. The simultaneous employment of water vapour, moreover, lowers the dissociation temperature so as to produce great economies. As is well known by a law of physical chemistry dissociation is facilitated if the dissociation pressure is reduced by intermixing an indifferent gas. Instead of the usual atmospheric pressure, there is then only a partial pressure to counteract decomposition, in the present case the partial pressure of the carbon dioxide in a mixture of carbon dioxide and water vapour, which both together have atmospheric pressure.

As a merely physical method of applying the new process the melting of drill-filings and of turning-filings and file dust upon an impervious hearth may be mentioned as an instance. An advantage of the process in this instance is the exclusion of the chemical action, i. e., in the present case the chemical action of oxidation, which otherwise takes place in metallurgical furnaces and the like, and which has to be counteracted otherwise by expensive previous compressing of the material. The formation of air flames i. e. air currents issuing in an atmosphere of heating gas is not exactly necessary in many forms of utilization, as has been found in the water gas process. One may also burn ordinary gas flames.

In lime burning, contact of the charge of chalk with the air is not detrimental. Therefore, the usual flames may burn namely gas flames burning in an atmosphere of air instead of air flames i. e. flames produced by introducing air currents in an atmosphere of burning gases as described above, and there is no limitation in the selection of such modes of working. The radiating action is the same.

As in the case of lime, water vapour may lie above the charge, so also in other cases some other gas might replace the vapour, e. g. carbon monoxide in preparing metallic sodium, as described, or water gas when producing illuminating gas. This overlying gas may be chosen according to the particular chemical process.

The possibilities of application of the invention are not limited to the embodiments described as examples of execution. The fundamental idea of the invention broadly speaking resides in the fact that heating by radiant energy is realized in such a manner that the radiant energy is caused to act upon the hot charge, and independently of the temperature prevailing along the path through which radiation occurs. The production of large quantities of heat, and increase in the efficiency are possible by this heating process, even when the heating gases are of low fuel value, which is accomplished by forcing the air, including preheated air or gas by pressure through the bricks or stones and filling 22 of the furnace. The radiation is not interfered with by the distance from the hearth; it will, on the contrary, be less subject to dispersion, and will more approximately become parallel, similarly to a parabolic mirror, the greater the distance from which it emanates. Besides, the distance is not of importance for an energy which is capable of traversing 300,000 kilometers a second.

Referring to Fig. 5 it will be noted that in this furnace, the grade 2 consists of flat, hollow plates 40 placed on edge, and immersed in a tank 41 which is filled with a sealing liquid, such for example, as kerosene and which is provided with an outlet opening 42. Otherwise, the arrangement and the construction of the furnace except as to its height is substantially the same as illustrated by Figure 1. The vapourous products of reaction escaping between the plates 40 of the grate 2, become condensed, and collect in the tank 41 from which they are discharged, while the remaining gases are conducted downwardly to the surface of the kerosene, and may be sucked off, through duct 6 located directly above the liquid level. The sodium condensate runs down the plates 40, falls into the oil or sealing liquid and is discharged through duct 42. Instead of kerosene, any other suitable oil or fluid cooling agent may be employed in the tank or container 41.

Figure 6 illustrates the employment of a grate cooled by injection of water in combination with a furnace according to this invention. In this case, the grate 2 consists of hollow bars 43 having a downwardly decreasing cross section, and provided with holes 44 on the opposite side walls. Into the hollow grate bars the cooling agent, water for example, is introduced which is then injected into the spaces between the grate bars through the holes 44. The reaction product which flows down between the grate bars is cooled by the injection of this cooling agent. Otherwise, the construction of this furnace may conform for example to the construction shown in Figures 1 and 2, and in the other figures of the drawing.

It is pointed out that the expression "grate" used in this specification and claims should be broadly interpreted. Thus, for example, the invention also comprises a construction in which, instead of an ordinary grate made from bars, a pervious or perforated hearth of fireproof, porous material, as for instance, fire clay, chamotte, or the like may be used.

The invention is also capable of other modifications and changes, as local conditions, and the nature of the substances to be treated may direct.

I claim:

1. A process for carrying out chemical reactions and physical processes at high temperatures which consists in exposing the material to be treated to the action of radiant energy in a flame furnace, i. e., a furnace with a flame as source of heat acting above the charge, a gaseous layer being interposed which keeps the flame gases remote from the charge, and the difference between the pressures above and below the charge being regulated to a value at least sufficient for compensating the buoyancy of said interposed gases resulting from the contact of these gases with the hot charge.

2. A process for carrying out chemical reaction and physical processes at high temperatures by exposing the material to be treated to the action of radiant energy in a furnace with a flame as source of heat above the charge, a gaseous layer being interposed which does not disturb the process and keeps the flame gases away from the charge, and the pressures above and below the charge being adjusted so as to prevent the buoyancy of the interposed gases which is produced by the hot charge.

3. A process for carrying out chemical reactions and physical processes at high temperatures by subjecting the material to be treated to the action of radiant energy in a furnace with a flame acting as source of heat above the charge, a gaseous layer being interposed which promotes the process and keeps the flame gases remote from the charge, and the pressures above and below the charge respectively being regulated so as to compensate the buoyancy of the interposed gases heated by the hot charge.

4. A process for carrying out chemical reactions and physical processes at high temperatures in which the material to be treated is exposed to radiant energy in a flame furnace i. e., in a furnace with a flame as source of heat acting above the charge, comparatively cool heating gases being admitted above the charge and at least a portion of said gases being burnt in the remaining part of the furnace by introducing air flames, and gas and air being supplied in an amount sufficient only for maintaining the intermediate gaseous layer and the source of heat.

5. A process for carrying out chemical reactions and physical processes at high temperatures by radiant energy in a furnace with a flame as source of heat acting above the charge, heating gases being caused to flow along said charge being then burned, at least in part, in the other part of the furnace in admixture with air, gas and air being supplied in an amount sufficient only to maintain the source of heat and an intermediate gaseous layer between charge and flame, and the pressures above and below the charge respectively being adjusted so as to compensate the buoyancy of the interposed gases heated by the hot charge.

6. A process for carrying out chemical reactions and physical processes at high temperatures by radiant energy in a furnace with a flame as source of heat acting above the charge, which consists in causing gases of any suitable chemical properties to flow directly along the charge, the gases required for burning purposes being fed to the furnace in an adjoining zone and being burned in the free space of the furnace in admixture with air.

7. A process for carrying out chemical reactions and physical processes at high temperatures in a furnace with a flame as source of heat acting above the charge, which consists in introducing a charge into the furnace, admitting gases of any suitable chemical composition directly along said charge, introducing the gases required for heating purposes to an adjoining zone of the furnace admitting air to said part and utilizing said heating gases by causing the liberated energy to be radiated upon the charge.

8. A process for carrying out chemical reactions and physical processes at high temperatures by radiant energy in a furnace with a flame as source of heat acting above the charge, a gaseous layer being interposed between the charge and the flame gases, and the volatile reaction products being led off downwardly through a permeable hearth.

9. In a process for carrying out chemical reactions and physical processes at high temperatures by radiant energy in a flame furnace, i. e., a furnace with a flame as source of heat acting above the charge introducing relatively cool heating gases above the charge and maintaining them in the furnace so as to form an intermediate relatively quiet layer keeping the flame gases remote from the charge, burning a portion of these gases in the upper parts of the furnace space in admixture with air, and supplying gas and air in an amount only sufficient for maintaining the intermediate gaseous layer and the source of heat.

10. In a process for carrying out chemical and physical processes at high temperatures by radiant energy in a furnace with a flame acting as source of heat above the charge, admitting relatively cool heating gases above the charge and keeping them in the furnace so as to form an intermediate layer between the charge and the flame, burning a portion of these gases in the upper furnace space in admixture with air supplying gas and air only to such an extent as to maintain the intermediate gaseous layer and the source of heat, and adjusting the pressures above and below the charge respectively so as to prevent the buoyancy of the gases heated by the hot charge.

11. In a process for carrying out chemical reactions and physical processes at high temperatures by radiant energy in a furnace with a flame acting as source of heat above the charge, admitting heating gases above the charge and keeping them in the furnace so as to constitute an intermediate layer between charge and flame, burning a portion of these gases in the upper part of the furnace space in admixture with air and adjusting the pressures above and below the charge so as to lead off downwardly the volatile reaction products through a permeable hearth.

12. A process for heating reducible compounds of metals capable of volatilization by heat in view of the production of metals from their compounds, which process consists in introducing a charge of said reducible compounds and carbonaceous substances into a furnace with a flame as source of heat acting above the charge, feeding comparatively cold heating gases along said charge, admitting air to the other part of the furnace, burning at least a portion of said heating gases and causing their liberated energy to be radiated towards the charge.

13. A process for obtaining alkali metals by heating in a furnace with a flame as source of heat acting above the charge, which consists in introducing into the furnace soda, reducible alkali compounds with coal as a charge, feeding comparatively cool heating gases along said charge, burning said heating gases in the remaining part of the furnace with air, and causing their liberated energy to be radiated upon the charge, and causing the alkali metals to be discharged from the radiating space through the grate.

14. A process of producing metals vaporous in the heat from their reducible compounds by heating in a furnace with a flame as source of heat acting above the charge, which consists in admitting heating gases to a charge comprising these reducible compounds and carbon-containing substances, introducing air into the other part of the furnace, and burning the heating gases, and radiating their generated energy against the charge, and discharging the volatile reaction products to the outside of the radiating space.

15. A process of conducting dissociations by heat in a furnace with a flame as source of heat acting above the charge, which consists in admitting heating gases along a charge made up of the substances to be treated, and causing combustion of said gases in the other part of the furnace by the admission of air, and radiating their liberated energy upon the charge, and discharging the volatile products towards the other side of the hearth.

16. A process of conducting dissociations by heat in a furnace with a flame as source of heat acting above the charge, which consists in feeding heating gases upon and along a charge of the substances to be treated, and causing them to be burned in the remaining part of the furnace by the admission of air, causing their liberated energy to be radiated towards the charge, admitting any other reagents between the charge and the heating gases and into the charge itself, and discharging the resulting volatile products towards the other side of the hearth.

In testimony whereof I affix my signature in presence of two witnesses.

HERMANN MEHNER, Ph. D.

Witnesses:
 PAUL LORENZ,
 CLEMENES CLEMENTE.